Patented July 28, 1942

2,291,293

UNITED STATES PATENT OFFICE 2,291,293

PRINTING INK AND SHORT VARNISH

Francis J. Curtis, St. Louis, Mo., assignor to Monsanto Chemical Company, St. Louis, Mo., a corporation of Delaware No Drawing. Application December 27, 1937, Serial No. 182,001

20 Claims. (Cl. 106—20)

This invention relates generally to printing inks and the manufacture thereof, and more particularly it pertains to printing inks containing a thickening agent for imparting desired characteristics thereto and the method of preparing the same.

Ink intended for use in connection with modern high speed presses must meet rather rigid specifications as to viscosity, drying qualities, and ease of application to the desired surface, depending upon the intended use of the ink. The ink must possess sufficient viscosity to permit application to the printing surface by means of inking rolls but must not string out between the surface to which it is applied by the press and printing surface so as to blur the outlines of the printed characters. This latter characteristic is often referred to in the art as the "shortness" of the ink, it being a comparative measure of the tendency of the ink to form strings or elongated portions before breaking. It will be readily understood that an excessively "long" ink will not form well-defined characters on the printed surface due to the fact that as the printing surface is drawn away from the printed surface, relatively long, stringy portions of ink will be formed which will fall upon the printed surface beyond the outlines of the printed characters, thereby blurring the same. The control of the "shortness" of the inks is, however, necessary, for in order to obtain good results, the ink must not be so "short" as to not properly adhere to the printed surface.

Known printing inks are somewhat similar in constitution and properties to the coating compositions used in the paint art. In general it may be said that each of the components of a printing ink is classified in one of the following groups:
1. Vehicles.
2. Compounds.
3. Pigments.
4. Dryers.

The present discussion will be largely limited to the first two of the above classes. The vehicles now generally used for printing inks fall in two well defined groups. The drying oil vehicles are oils which form a tough relatively dry film by oxidation. The other type includes those liquid oils which volatilize readily to leave a film composed principally of the pigments, extenders, or other compounds present in the ink suspension. The present thickening agent is suitable for use in connection with either type of vehicle or with a mixture of vehicles from both groups. It is generally possible to obtain a thickening agent falling within the defined group to which this invention pertains which will be compatible with any desired vehicle or mixture of vehicles, since the thickening action of my compounds is not dependent to any extent upon chemical action.

In order to meet viscosity requirements for specific purposes, it has been the custom to modify the body of the ink by various means. If the vehicle is a drying oil, this can be accomplished usually by heating the oil. For instance, linseed oil can be thickened by heating the boiled or raw oil to a temperature of 600° F. until the oil assumes the desired viscosity. Oils treated in this manner are known as varnishes in the trade and may have viscosities ranging from that of the untreated oil to that of molasses. It is customary to decrease the viscosity characteristics when necessary by the addition of low boiling solvents such as petroleum spirits.

For high speed work, such as is encountered in newspaper printing, low boiling solvents, such as petroleum fractions, are often employed in whole or in part as the vehicle. These materials have a low viscosity and a high rate of absorption into the paper, but they are not suitable for use in the preparation of printing inks without the addition of thickening agents.

A large number of compounds are capable of being used as thickeners in printing inks which contain a low boiling vehicle. Among the more important of the previously known thickeners are beeswax, lard, tallow, and petroleum jelly. Lard, tallow, and petroleum jelly have a decided tendency to retard the drying time of printing inks, while beeswax causes the inks to be dull appearing and to present a grainy look as though not ground. Some of the water insoluble soaps, such as aluminum resinate, have been proposed for use as thickeners, but these often cause the ink to be objectionably long. Inorganic thickening agents such as blanc fixe, precipitated barium sulfate, and aluminum hydrate have been used for this purpose. The amounts of agents of the type known prior to my invention which are required are so large when the desired thickening effect is had that the appearance of the ink is materially affected. This result is particularly noticeable with colored inks, in which the color may be dulled to such an extent that the appearance is displeasing.

I have discovered that certain gels in which the swelling liquid has been replaced by another medium are excellent thickening agents for printing inks.

It is, therefore, an object of the present invention to provide a short printing ink of desired consistency by incorporation in the ink of a small proportion of a gel.

A further object of this invention is the provision of a thickening agent for printing ink and the like of such character that its use will avoid the necessity of heat-treating drying oils or adding gummy compounds in the production of the ink.

The invention also contemplates the provision of a thickening agent for printing ink and the like which may be used in relatively small amounts.

The thickening agents used in accordance with this invention are of a gel structure, and preferably inorganic in character. While organic gels inert to the other constituents of the ink may be employed, it is thought that better results are effected by the use of metallic oxide gels, such as gels of silica, alumina, magnesia, etc.

The thickened inks may be prepared in either of two ways. The liquid phase of a gel may be replaced by gas in such a manner that the gel structure is maintained substantially unimpaired, and the resultant aerogel ground into the ink vehicle in proper amounts to form the desired inks. Alternatively, the liquid of the original gel may be replaced by the vehicle and this combination homogeneously incorporated into the ink.

As exemplary of the modes of preparing the thickened inks of this invention, the following processes of preparing thickened inks by the two alternate methods noted above are set forth:

*Example I.*—346 pounds of sodium silicate solution containing 8.85% $Na_2O$ and 28.8% $SiO_2$-$H_2O$ is slowly added with agitation and, after first diluting with 122 pounds of water, to a solution of sulfuric acid prepared by adding 54.0 pounds of 95.5% sulfuric acid to 200 pounds of water. The pH of the mixture of acid and sodium silicate solution is usually maintained between 4.7 and 4.9. The resultant gel is allowed to set for one hour and then removed and crushed between metal rolls set about ½ inch apart. Gel as thus crushed is washed with water at the rate of 10 gallons per minute for three hours to remove sodium sulfate. Water in the gel is now replaced with alcohol by washing with 95% ethyl alcohol at the rate of 4 gallons per minute until the effluent alcohol has a concentration of around 90% by weight. This washing will require about 10 hours. Particles of gel, in which the continuous phase is now a liquid consisting principally of alcohol, are removed to an autoclave and heated rapidly to a point slightly above the critical temperature of alcohol. The temperature is maintained at this point while the pressure is held at near the critical by allowing a portion of the alcohol to escape until the greater portion of the alcohol has been removed. The pressure is now released and the gel removed. In United States Letters Patent 2,093,454, the process outlined above and the product, known as an aerogel, are fully described. Aerogel is a light substance having substantially the original gel structure, but the original continuous phase is replaced by air.

The amount of aerogel to be incorporated in the ink will depend upon the characteristics of the unthickened ink and the requirements to be met by the final product. Amounts of aerogel up to 6% or 8% by weight of the liquid vehicle are ordinarily enough to make an extremely thick liquid of one that was originally very thin. The size of the particles of aerogel is an important factor to be considered in determining the amount of gel to be added to the ink. Finely ground gel should be used in larger amounts to obtain the same result.

The methods commonly used for homogeneously incorporating a solid thickening agent in printing ink may be used in the process of the present invention. One mode of operation that has been found to be satisfactory involves the preparation of a slurry of the ink and thickening agent by mechanical agitation and the subsequent grinding of the aerogel into the finished product by passing the mixture between closely set rolls driven at different speeds. An ordinary paint mill is suitable for the grinding operation. After a second pass through the mill, the ink will be found to have the desired consistency if the requisite proportion of aerogel has been properly determined and added to the slurry.

Amounts of aerogel substantially less than 15% are generally sufficient to thicken the ink to the desired consistency. Preferably the proportion of aerogel added to a clear varnish to make a printing ink is between 5% and 10%, although these proportions are not limiting for all purposes. The following example is illustrative of thickened ink vehicles that have been prepared by the present process.

*Example II.*—10% by weight of silica aerogel was stirred into a quick drying clear varnish vehicle by means of a spatula. The resultant mix was an extremely viscous slurry and somewhat opaque because of occluded air bubbles. The slurry was passed through a paint mill several times. Each pass increased the transparency and decreased the stiffness of the mixture until after the fifth pass there was no further appreciable change. The product was then as transparent as the original vehicle, but so stiff that it would flow only very slowly when the bottom of the container was tilted into a vertical plane. When a glass rod was pushed down into the mass and then withdrawn, a string of about one inch in length would form before breaking.

*Example III.*—It will be understood that the water in the gel as originally formed may be replaced by liquids other than alcohol. In performing any replacement step it is necessary that the liquid forming the continuous phase of the gel and the liquid which is to replace it be miscible. By employing several steps, a gel may be formed in which the continuous phase is any desired fluid substance. A gel in which the continuous phase is the vehicle of the printing ink may be prepared by replacement of the alcohol with ether, and replacement of the ether with petroleum spirit. By a similar process, a gel may be formed in which the continuous phase is a drying oil. Gels carrying the vehicle may be incorporated into a partially prepared printing ink with good results.

It is also within the scope of this invention to add an ether gel or a gel containing other volatile solvent to an unthickened printing ink, and to subsequently remove the ether or other liquid by flash distillation or a like process.

When used in the manner above described, the finely divided gels are optically inert. Particularly, the use of gels of metallic oxides which are ordinarily white in color gives very good inks. Oxide gels of magnesium, silicon, aluminum, zinc, and tin are representative of this latter group. The absence of its optical effect may be due in large measure to the size of the particles and refractive index. A fine state of subdivision without prolonged grinding is had due to the extremely light, porous structure of the gels manufactured in accordance with my invention. This property is exemplified by the fact that when the aerogel is removed from the autoclave by a suction line and passed through a centrifugal fan creating the suction, the greater proportion of the particles are so light as to float in air. While accurate measurements of the particle size have not been made, it has been found that about 70% of the mass will pass a 100 mesh screen. The aerogels have little or no effect upon the color characteristics of the finished ink. Similarly, gels having liquids as the continuous phase become finely divided during the process of incorporation in the ink.

The optical inertness of finely divided gels is of particular advantage in inks to be used for multicolor printing. In the multicolor printing process it is desirable that the ink be transparent to a degree, and inks prepared for multicolor printing in accordance with this invention fully meet the stated requirement.

Although the small particle size of gels incorported into inks by the process of my invention results in relatively low pigmentation when used alone as pigments for inks, it is contemplated that the thickening agent may be composed in whole or in part of a gel of a metal oxide normally used as a pigment. A chromium oxide aerogel has been incorporated in printing ink, and it has been found that the tinctorial value of the gel is small. However, such a gel may be used in combination with a known pigment in order to obtain a thickened printing ink having good color. In such case it is probable that the pigmentation is due, in part, to the gel.

This invention also contemplates the use of gels of metallic oxides which will act as driers to thicken printing inks. A manganese oxide gel may be added to printing ink so that the original mixture will be thickened and drying of the printed characters will be promoted by the addition of one agent.

By employing different concentrations of the reactant solutions, flexibility of action is achieved for the thickening agent. It will be readily understood that the proportion of voids in the final gel will depend upon concentration of the hydrogel as precipitated. Thus, the proper thickening gel for any purpose may be determined in advance and the gel prepared to give best results.

Further advantage will be derived from the use of the novel thickening agent by reason of the fact that it is generally chemically inert to materials commonly present in printing inks or press parts, although a gel having drying properties may be used if found desirable.

As distinguished from the present thickening agent, known inorganic fillers such as talc and asbestine, aluminum hydrate, or blanc fixe are characterized by low oil absorption and consequently large amounts are necessary in order to bring about appreciable increase in viscosity, and at the same time since they are in a sense pigments, they modify the color value of the finished ink, either by rendering it too opaque or too dull and flat or because the addition of excessive amounts of coloring matters is required in order that the original color characteristics be maintained. The use of organic thickening agents heretofore known have been, as noted above, attended with other disadvantages not found in inks prepared in accordance with my invention.

From the above it is clear that this invention contemplates the incorporation in an ink or other liquid to be thickened of finely divided particles of a gel in which the original gel structure is maintained substantially unimpaired.

I claim:

1. A printing ink composition which has been thickened by the addition of an inorganic aerogel in amounts sufficient to materially "shorten" the ink composition.

2. The composition substantially described in claim 1 and further characterized in that there has been added .5 to 5.0% by weight of an aerogel whose apparent specific gravity is not more than 15% of the true specific gravity.

3. A printing ink comprising a printing ink vehicle, pigment and silica aerogel, the silica aerogel being present in an amount of about 5% or less by weight and in a quantity sufficient to substantially increase the viscosity of the ink.

4. A printing ink comprising a printing ink vehicle, pigment, and 1%–10% by weight of silica aerogel.

5. A coating composition comprising an organic film forming vehicle and about 5% by weight of silica aerogel, the composition having the same color as the composition without the aerogel.

6. A thickened printing ink comprising a printing ink vehicle and from 1 to 10% by weight of an aerogel.

7. A printing ink embodying as a thickening agent from 1 to 10% by weight of an inorganic aerogel which is compatible therewith.

8. A coating composition comprising an organic film-forming vehicle and from 1 to 10% by weight of an inorganic aerogel the composition having the same color as the composition without the aerogel.

9. A printing ink comprising a printing ink vehicle and a thickening agent including a manganese oxide aerogel, said gel being present in amounts varying from .5 to 10% by weight of said vehicle.

10. A coating composition comprising an organic film-forming vehicle and from 1 to 10% by weight of an aerogel, the composition having the same color as the composition without the aerogel.

11. A process of thickening printing ink comprising thoroughly admixing with said ink a preformed gel having as the continuous phase a fluid other than water which is compatible with the other constituents of said ink and does not alter the transparency or color of said ink, said gel having been originally formed in water and being substantially free of water and retaining substantially its gel structure as originally formed, and said gel being present in amounts sufficient to materially "shorten" the ink composition.

12. A substantially water-free short varnish suitable for printing ink and the like which is thickened with a preformed inorganic gel having as the continuous phase a fluid other than water which is compatible with the other constituents of said ink and does not alter the transparency or color of said ink, said gel having been originally formed in water and being substantially free of water and retaining substantially its gel structure as originally formed, and said gel being present in amounts sufficient to materially "shorten" the ink composition.

13. The composition as defined in claim 12 and further characterized in that the gel is a silica gel.

14. A process of thickening a coating composition comprising grinding into said coating composition from 1 to 10% by weight of an aerogel.

15. A substantially water-free printing ink comprising a printing ink vehicle and a thickening agent including a preformed gel having as the continuous phase a fluid other than water which is compatible with the other constituents of said ink and does not alter the transparency or color of said ink, said gel having been originally formed in water and being substantially free of water and retaining substantially its gel structure as originally formed, and said gel being present in amounts sufficient to materially "shorten" the ink composition.

16. A substantially water-free coating composition comprising an organic film forming vehicle and a preformed gel having as the continuous phase a fluid other than water which is compatible with the other constituents of said coating composition and does not alter the transparency or color of said coating composition, said gel having been originally formed in water and being substantially free of water and retaining substantially its gel structure as originally formed, and said gel being present in amounts sufficient to thicken the coating composition but insufficient to alter its original appearance.

17. A coating composition to which there has been added from 1 to 10% by weight of an aerogel.

18. A substantially water-free printing ink comprising a printing ink vehicle and a thickening agent including a preformed gel originally prepared in an aqueous swelling medium and containing as the continuous phase the liquid constituting the vehicle of said ink, said gel being substantially free of the original swelling medium and having substantially the gel structure as originally formed and being present in amounts sufficient to materially "shorten" the ink.

19. A substantially water-free coating composition comprising an organic film forming vehicle and a thickening agent including a preformed gel originally prepared in an aqueous swelling medium and containing as the continuous phase a drying oil, said gel being substantially free of the original swelling medium and having substantially the gel structure as originally formed and being present in an amount sufficient to thicken the coating composition but insufficient to alter its original appearance.

20. A coating composition to which there has been added from 1 to 10% by weight of silica aerogel.

FRANCIS J. CURTIS.